Patented Nov. 1, 1932

1,885,411

UNITED STATES PATENT OFFICE

EDWARD M. BROWN, OF TOLEDO, OHIO

PROCESS OF MAKING ENZYMATIZED STOCK FEED

No Drawing.  Application filed March 30, 1929. Serial No. 351,459.

This invention relates to a feed especially prepared for cattle and other live stock. One of its objects is to provide a substantially balanced ration which, as far as possible, produces in the animal the same physiological conditions as occur in the natural state during the spring and summer months. It is generally agreed that green grass in the spring and early summer contains a comparatively high proportion of enzymes and vitamins and other nutritive ingredients in a form that is easly hydrolyzed, and readily and completely assimilated by the animal. With this in mind, the invention is fundamentally based upon the theory that the best results are to be obtained by producing a feed which is not too highly concentrated, but which will contain the same compounds as green grass, all of the nutritive ingredients being in such a form that they may be readily and completely assimilated by the animal.

In carrying out my improved process, therefore, various grains are sprouted until they attain a maximum enzyme content. The resulting material is then mixed with roughage and water and maintained for some hours at a temperature between 130° and 140° F. During this time, the roughage is to a large extent hydrolyzed and enzymatized by the culture which has been produced by sprouting the grains, resulting in a feed which is relished by the animal and is easily assimilated, practically in its entirety. The primary objects of this treatment is to restore to the dry roughage the vitamins and other readily assimilable compounds which have been lost or changed in drying, and in fact to produce a feed which is substantially equivalent to green feed of the very best quality.

Another object is to make use of corn stalks, coarse hay and the like, a large percentage of which is usually wasted, and to produce therefrom, not only a feed which is succulent and relished by the animal, but one in which even the coarsest parts will be easily digestible so that there will be no possibility of compaction of the bowels. The feed also preferably includes certain inorganic compounds which have been found beneficial to the animals. It is also desirable for the feed to contain a small percentage of iodine, which may be obtained from dulse.

In preparing the feed according to my invention, various classes of enzymes are obtained from different grains. One formula calls for, barely sixty cents, oats thirty percent and corn ten percent, but wheat and rye may be added without changing the relative proportions of the other grains. The different grains are first sprouted until they have the highest enzymatic content. This point will be determined for each kind of grain, and is usually when the sprouts are about one-half inch long. When the sprouting has reached this point, the grain is dried at a low temperature and then ground. The action of the enzymes assists in the conversion of the various grains, and also of roughage mixed therewith, in a manner to promote the most complete digestion thereof.

After the sprouted grains are dried and ground, they may be kept for any desired length of time. In preparing feed for the animals this enzymatic compound is mixed with corn fodder, dry hay or other roughage. This mixture will be in the proportion of three percent to ten percent of the enzymatic compound and eighty-eight to ninety-five percent of roughage with two percent salt added. Water is then added to the mixture in the proportion of two and one half to four pounds of water to one pound of dry roughage. The water is first heated to a temperature of 130° to 140° F. The mixture is then placed in a heat insulating tank, similar to a fireless cooker, and allowed to stand about eighteen hours.

The water used in sprouting the grains should contain a relatively high proportion of calcium salts, and if such water is not conveniently obtainable in the natural state, ground limestone may be added to it before the grain is sprouted. A suitable amount of iodine in solution may be obtained by grinding up dulse, soaking it in the water and then extracting the water therefrom. By this means, the sprouted grains take up a considerable percentage of calcium and some iodine.

In the preparation of this improved feed, diatase is developed in the barley, cytase in the oats and protease in the corn. Wheat and rye, to a certain extent, supply all of these enzymes. Wheat and rye to a certain extent supply all of these ingredients. During the process of preparing the feed, the calcium carbonate tends to break down or dissolve the cell walls and hydrochloric acid produced from the salt aids in this process. The enzymatic compounds restore to the roughage in assimilable form substantially the same constituents that are lost in the curing of the roughage. The resulting product is succulent, greedily devoured by the animals and easily assimilated. It may be consumed in large quantities by producing cows with a corresponding increase in production.

The feed is so constituted that it may be used to the exclusion of all other feed. It contains all the elements of a properly balanced ration in a readily available form, including the elements which have heretofore been obtained only in green grass, so that the animal is maintained in a healthy physical condition. As a feed, it is approximately equivalent to green grass, containing all the enzymes which promote the conversion and assimilation of the various organic compounds, as well as a high proportion of the vitamins which are essential in promoting the health of the animal. When it is fed to milch cows, therefore, a maximum amount of milk will be obtained without lowering their vitality.

While I have suggested various ingredients in proportions suitable for feeding milch cows, it will be understood that these may be varied to a certain extent in accordance with the kind of stock raised and the results desired. For feeding poultry and small animals like rabbits, for instance, the enzymatic compound is mixed with other grain or feed and merely moistened.

What I claim is:

The process of preparing a stock feed which includes the preparation of an enzymatic compound by sprouting cereal grains in a solution containing soluble mineral salts, said salts becoming organically incorporated in said sprouts, said solution also containing calcium carbonate in a quantity sufficient to neutralize any excess acid in the solution, stopping the growth when the grain has reached substantially its highest enzyme content, then drying and grinding the sprouts, and subsequently mixing the same with cut roughage and water, maintaining said mixture for a time at a temperature not higher than substantially 130° F., whereby said roughage is partially enzymatized and hydrolized.

In testimony whereof I have hereunto signed my name to this specification.

EDWARD M. BROWN.